United States Patent
Yagasaki

(10) Patent No.: US 11,072,016 B2
(45) Date of Patent: Jul. 27, 2021

(54) METHOD FOR MANUFACTURING METAL ELEMENT FOR CONTINUOUSLY VARIABLE TRANSMISSION

(71) Applicant: HONDA MOTOR CO., LTD., Tokyo (JP)

(72) Inventor: Toru Yagasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 558 days.

(21) Appl. No.: 15/964,641

(22) Filed: Apr. 27, 2018

(65) Prior Publication Data
US 2018/0311719 A1 Nov. 1, 2018

(30) Foreign Application Priority Data

Apr. 28, 2017 (JP) .............................. JP2017-089296
Sep. 25, 2017 (JP) .............................. JP2017-184031

(51) Int. Cl.
| | | |
|---|---|---|
| B21D 35/00 | (2006.01) | |
| B21D 28/14 | (2006.01) | |
| B21D 53/14 | (2006.01) | |
| F16H 9/12  | (2006.01) | |

(52) U.S. Cl.
CPC .......... B21D 35/001 (2013.01); B21D 28/14 (2013.01); B21D 53/14 (2013.01); F16H 9/12 (2013.01)

(58) Field of Classification Search
CPC ....... B21D 35/001; B21D 28/14; B21D 53/16
See application file for complete search history.

(56) References Cited

U.S. PATENT DOCUMENTS

2016/0053852 A1   2/2016   Yagasaki et al.

FOREIGN PATENT DOCUMENTS

| CN | 101340989 A   | 1/2009  |
| CN | 101617143 A   | 12/2009 |
| CN | 105264261 A   | 1/2016  |
| JP | S62-86770 U   | 6/1987  |
| JP | 2563817 B2    | 12/1996 |
| JP | 2002-213539 A | 7/2002  |

(Continued)

OTHER PUBLICATIONS

Search Report dated Aug. 1, 2019, issued in counterpart CN Application No. 2018103296566 (1 page).

(Continued)

*Primary Examiner* — Teresa M Ekiert
(74) *Attorney, Agent, or Firm* — Westerman, Hattori, Daniels & Adrian, LLP

(57) ABSTRACT

A method for manufacturing a metal element includes performing press processing and punching processing on a band plate-shaped metal element material having a constant cross section by a mold with a main punch in contact with a rear surface of the metal element and a counter punch in contact with the front surface thereof. The main punch or the counter punch has protrusion portions which are in contact with at least a part of the ear portion or the body portion to form a recessed portion, and a bulging portion bulging in the longitudinal direction from the radial direction inner edge of ear portions of the metal element or the radial direction outer edge of a body portion thereof, which is formed by the material extruded from the recessed portion by the protrusion portion.

9 Claims, 17 Drawing Sheets

(56) References Cited

FOREIGN PATENT DOCUMENTS

| | | | | |
|---|---|---|---|---|
| JP | 2006-503236 | A | 1/2006 | |
| JP | 2006183850 | A * | 7/2006 | ............ B21D 53/14 |
| JP | 2007-175772 | A | 7/2007 | |
| JP | 4132820 | B2 | 8/2008 | |
| KR | 2004-0043813 | A | 5/2004 | |
| WO | 2014/156432 | A1 | 10/2014 | |
| WO | 2014/196254 | A1 | 12/2014 | |

OTHER PUBLICATIONS

Office Action dated Sep. 19, 2019, issued in counterpart CN Application No. 201810329656.6, with English translation (7 pages).
Office Action dated Mar. 27, 2019, issued in counterpart JP application No. 2017-184031, with English translation. (4 pages).

* cited by examiner

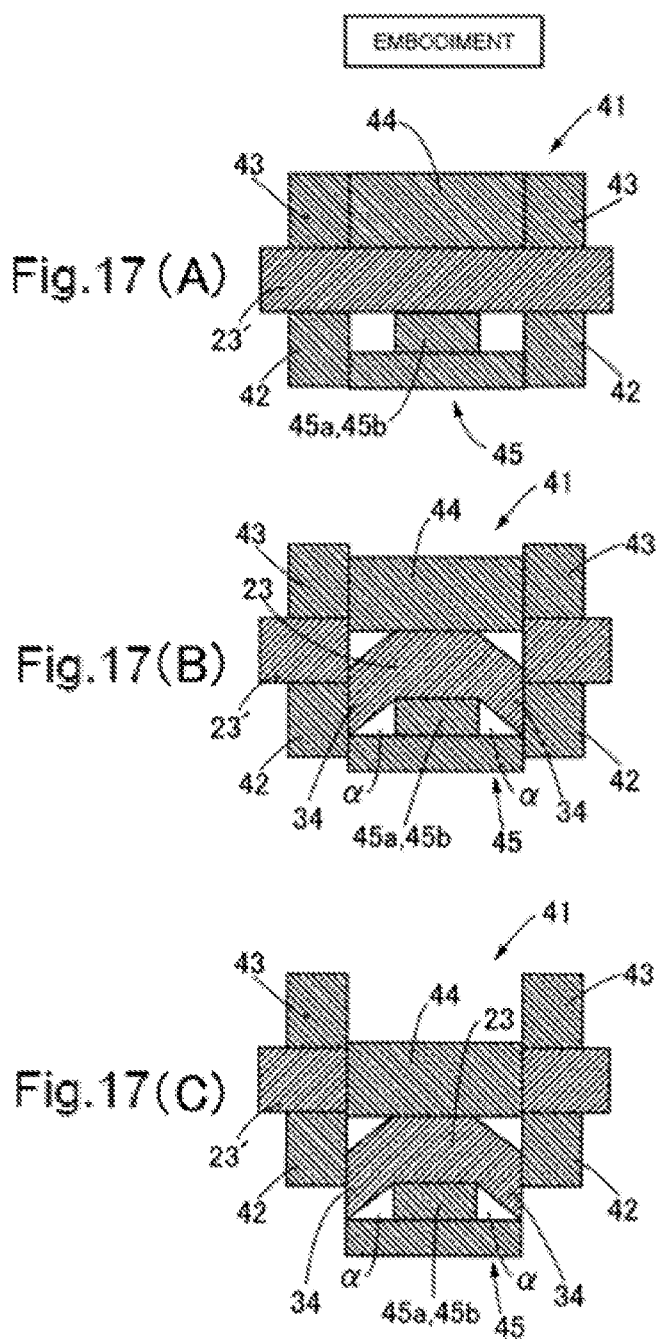

METHOD FOR MANUFACTURING METAL ELEMENT FOR CONTINUOUSLY VARIABLE TRANSMISSION

CROSS-REFERENCE OF RELATED APPLICATION

This application claims priority of Japanese Patent Application No. 2017-089296 filed in Japan on Apr. 28, 2017 and Japanese Patent Application No. 2017-184031 filed in Japan on Sep. 25, 2017, the entire contents of which are incorporated herein by reference.

TECHNICAL FIELD

The present invention relates to a method for manufacturing metal element for continuously variable transmission by performing press processing and punching processing on a band plate-shaped metal element material having a constant cross section using a metal mold to manufacture a metal element for continuously variable transmission.

BACKGROUND OF THE INVENTION

A method for manufacturing a metal element to be used for a metal belt of a belt-type continuously variable transmission by performing pressing and finish molding of a metal element material roughly formed into a shape close to the shape of the metal element product with a metal mold made of a main punch and a counter punch so as to improve the accuracy of the shape near the rocking edge of the metal element while ensuring the durability of the metal mold is publicly known from JP 4132820 B2.

Publicly known from WO 2014/196254 A shown below is one in which a position of the rocking edge of a metal element used for the metal belt of belt-type continuously variable transmission is made to coincide with a front edge position of a saddle surface which is the radially outer end position of a front surface of a body portion of a metal element, wherein a recessed portion is formed on the rear surface of the neck portion and the ear portion of the metal element, so that when the metal element on the rear side is displaced radially outward with respect to the metal element on the front side, the inclined surface of the body portion of the rear metal element comes into abutment with the body portion of the front-side metal element across the full length in the lateral (left-right) direction, and the bending load applied to the portion where the neck portion connects to the body portion is reduced to suppress the bending of the neck portion.

By the way, when a metal element is manufactured by pressing a metal element material with a metal mold consisting of a main punch and a counter punch, the plate thickness of the metal element may become uneven and the plate of the ear portion may become larger than the plate thickness at the radially outer end of the body portion, and when many metal elements are brought into close contact with each other at the chord portion of the metal belt wound around the drive pulley and the driven pulley to transmit the driving force, the chord portion of the metal belt is bent due to the difference in thickness difference and there is a possibility that the transmission efficiency of the driving force is lowered.

There is a need of, in consideration of the above-mentioned circumstances, making it possible to adjust the plate thickness balance inside and outside in the radial direction of the metal element when a metal element is manufactured by pressing with a metal mold.

SUMMARY OF INVENTION

According to a first embodiment of the present invention, there is provided a method for manufacturing a metal element for a continuously variable transmission for manufacturing, by performing press processing and punching processing on a band plate-shaped metal element material having a constant cross section by using a metal mold, a metal element including a pair of ring slots with which a pair of metal rings are engaged, a neck portion located between the pair of ring slots, an ear portion continuous to a radial direction outer side of the neck portion, and a body portion formed with a saddle surface supporting an inner peripheral surface of the metal ring continuous to a radial direction inner side of the neck portion, wherein the metal element is formed with a rocking edge extending, on the front surface of the body portion, in a lateral direction overlapping with the front edge of the saddle surface and an inclined surface extending in a radial direction inner side and rearwardly from the rocking edge, wherein the metal mold includes a main punch in contact with a rear surface of the metal element and a counter punch in contact with the front surface thereof, wherein the main punch or the counter punch has a protrusion portion which are in contact with at least a part of the ear portion or the body portion to form a recessed portion, and wherein a bulging portion bulging in the longitudinal (front-rear) direction from the radial direction inner edge of the ear portion or the radial direction outer edge of the body portion is formed by the material extruded from the recessed portion by the protrusion portion.

Furthermore, according to a second embodiment of the invention, in addition to the configuration of the first embodiment, there is provided the method for manufacturing a metal element for a continuously variable transmission, wherein in a state where press processing and punching processing of the metal element by the metal mold is completed, a gap is present between the main punch or the counter punch and the metal element.

Furthermore, according to a third embodiment of the invention, in addition to the configuration of the first and second embodiments 2, there is provided the method for manufacturing a metal element for a continuously variable transmission, wherein a volume of the protrusion portion approximately match a volume of the bulging portion.

Furthermore, according to a fourth embodiment of the invention, in addition to the configuration of any one of the first to third embodiments, there is provided the method for manufacturing a metal element for a continuously variable transmission, wherein the protrusion portion is in contact with a lateral direction central portion and a lateral direction both end portion of the ear portion.

Furthermore, according to a fifth embodiment of the invention, in addition to the configuration of any one of the first to fourth embodiments, there is provided the method for manufacturing a metal element for a continuously variable transmission, wherein the metal element material has a groove portion at a position corresponding to the bulging portion.

It should be noted that the main punch 44 and the counter punch 45 according to the embodiments correspond to the metal mold of the present invention.

EFFECT OF THE INVENTION

According to the configuration of the first embodiment, a metal mold for manufacturing a metal element by performing press processing and punching processing on a band plate-shaped metal element material having a constant cross section includes a main punch in contact with a rear surface of the metal element and a counter punch in contact with the front surface thereof. The main punch or the counter punch has protrusion portions which are in contact with at least a part of the ear portion or the body portion to form recessed portion, and wherein a bulging portion bulging in the longitudinal direction from the radial direction inner edge of the ear portion or the radial direction outer edge of the body portion is formed by the material extruded from the recessed portion by the protrusion portion. Therefore, by changing the plate thickness of the ear portion and/or the body portion with the bulging portion, the plate thickness balance inside and outside in the radial direction of the metal element can be adjusted.

According to the configuration of the second embodiment, in a state where press processing and punching processing of the metal element by the metal mold is completed, a gap is present between the main punch or the counter punch and the metal element. Therefore, the material extruded from the recessed portion by the protrusion portion flows into the gap, so that the bulging portion can be reliably formed, and moreover, by reducing the load applied to the main punch and the counter punch, the durability of the metal mold is improved.

According to the configuration of the third embodiment, a volume of the protrusion portion approximately match a volume of a bulging portion. Therefore, the projecting height of the bulging portion can be simply adjusted by changing the projecting height of the protrusion portion.

According to the configuration of the fourth embodiment, the protrusion portion is in contact with the lateral direction central portion and the lateral direction both end portion of the ear portion. Therefore, the bulging portion can be reliably formed by the material extruded from both of the lateral direction central portion and the lateral direction both end portion of the rear surface of the ear portion by the protrusion portion.

According to the configuration of the fifth embodiment, wherein the metal element material has a groove portion at a position corresponding to the bulging portion. Therefore, the projecting height of the bulging portion can be adjusted by absorbing a part of the material extruded from the recessed portion and constituting the bulging portion with the groove portion.

BRIEF DESCRIPTION OF THE DRAWINGS

FIGS. 17(A)-17(C) are schematic explanatory views showing operation of a punching machine. (Seventh Embodiment)

MODES FOR CARRYING OUT THE INVENTION

First Embodiment

The first embodiment of the present invention will be described below with reference to FIGS. 1 to 9.

Figure 1:
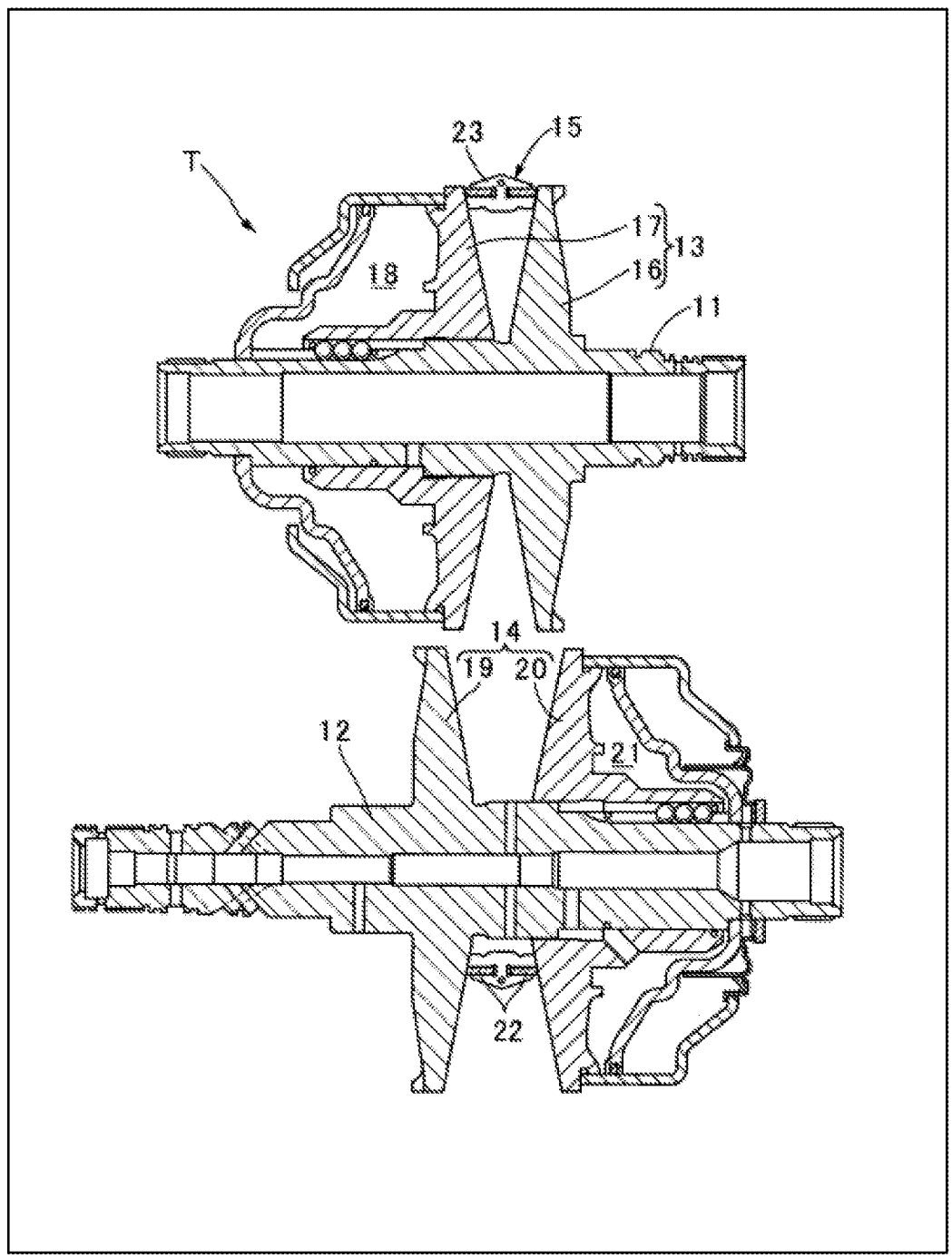
FIG. 1 is a figure showing overall configuration of a belt-type continuously variable transmission. (First embodiment)

FIG. 1 shows a schematic structure of a belt-type continuously variable transmission T mounted on an automobile. The belt-type continuously variable transmission T includes a drive shaft 11 connected to an engine and a driven shaft 12 connected to a driving wheel. An endless metal belt 15 is wound around a drive pulley 13 provided with a drive shaft 11 and a driven pulley 14 provided with a driven shaft 12. The drive pulley 13 includes a fixed-side pulley half body 16 fixed to the drive shaft 11 and a movable-side pulley half body 17 capable of being brought into and out of contact with the fixed-side pulley half body 16. The movable-side pulley half body 17 is biased towards the fixed-side pulley half body 16 by the hydraulic pressure acting on the oil chamber 18. The driven pulley 14 includes a fixed-side pulley half body 19 fixed to the driven shaft 12 and a movable-side pulley half body 20 capable of being brought into and out of contact with the fixed-side pulley half body 19. The movable-side pulley half body 20 is biased towards the fixed-side pulley half body 19 by the hydraulic pressure acting on the oil chamber 21.

Figure 2:
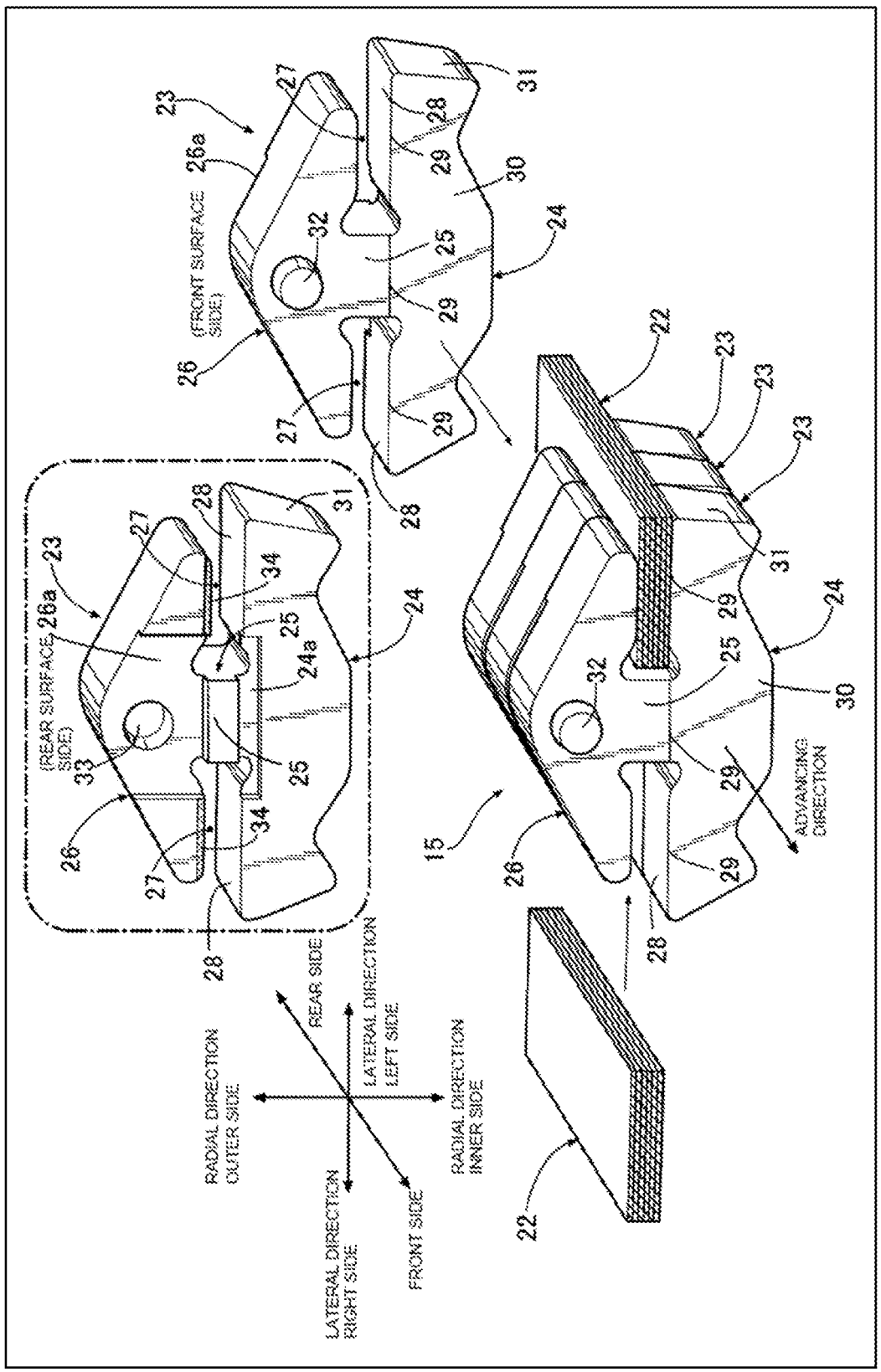
FIG. 2 is a perspective view showing a metal belt and a metal element. (First embodiment)
Figure 3:
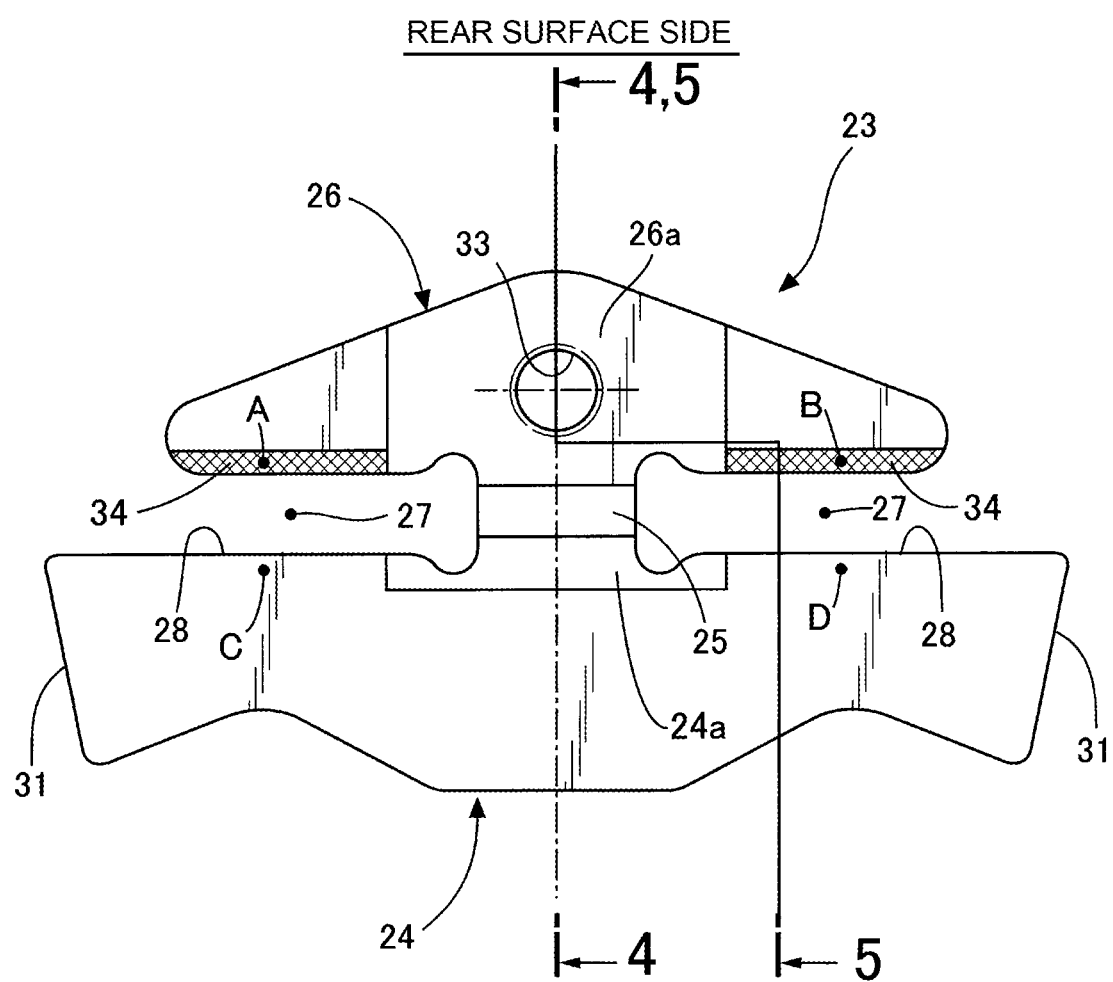
FIG. 3 is a rear view showing a metal element. (First embodiment)
Figure 4:
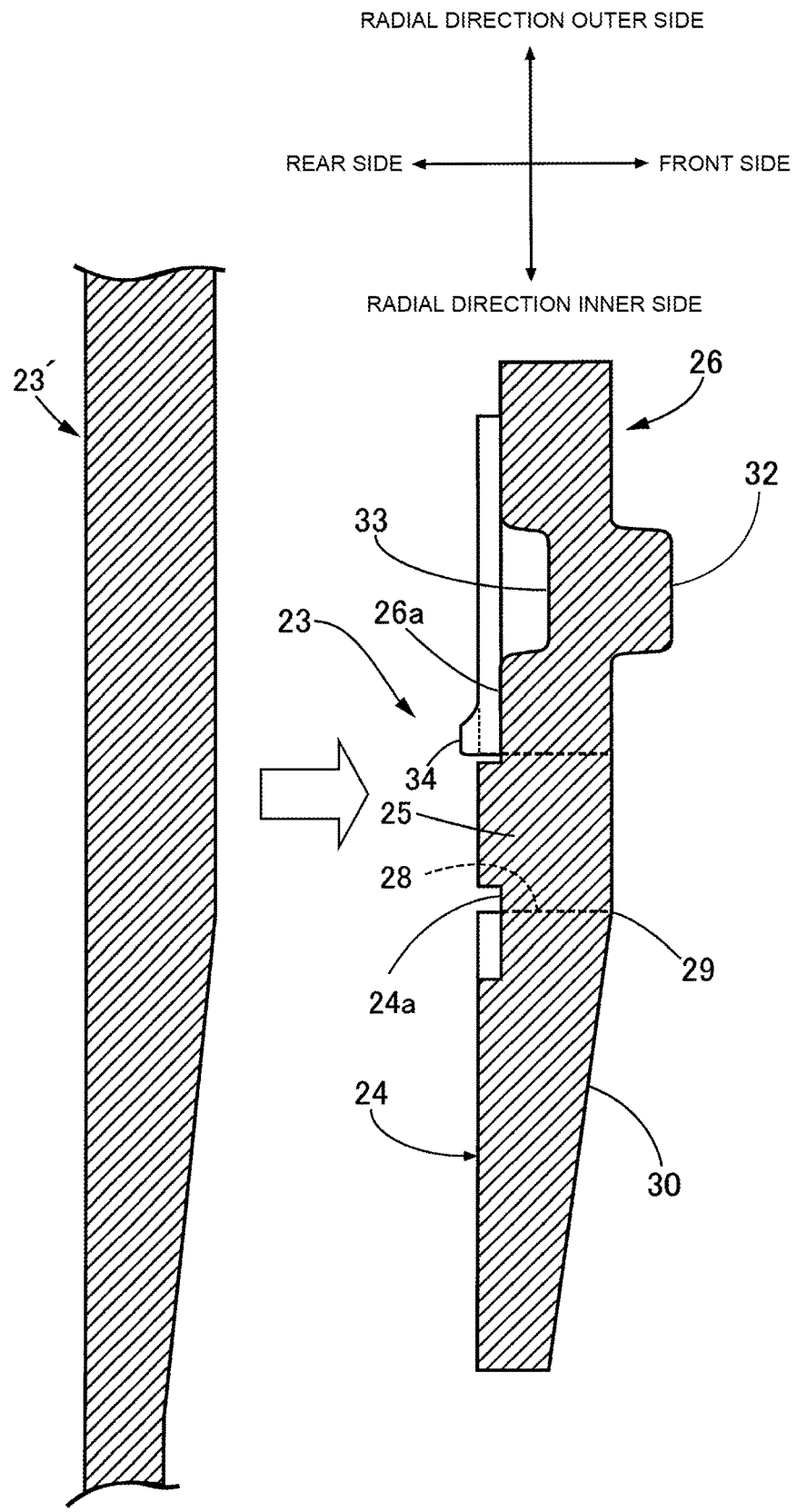
FIG. 4 is a cross sectional view taken along line 4-4 of FIG. 3. (First embodiment)
Figure 5:
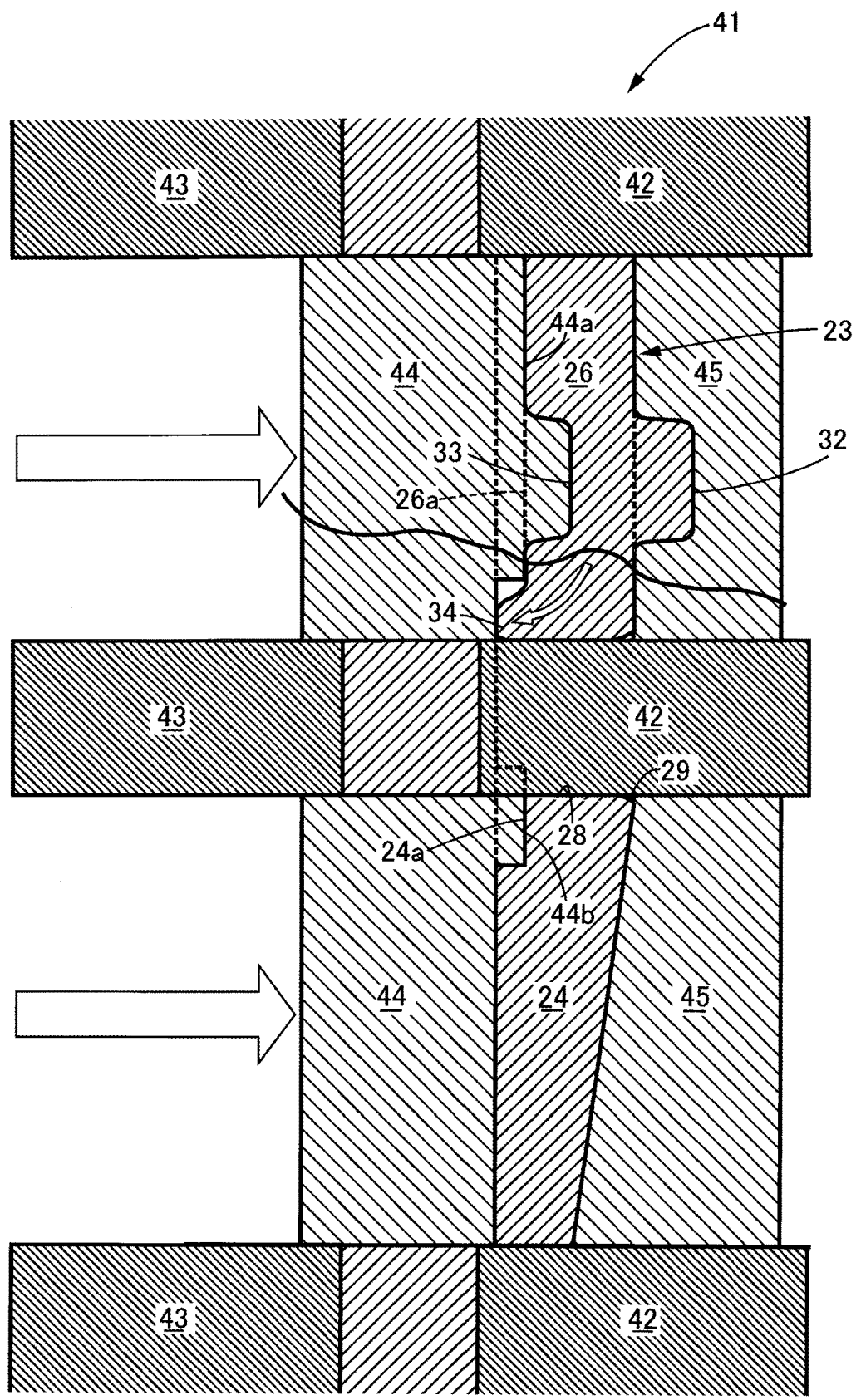
FIG. 5 is a sectional view showing a metal mold corresponding to the cross section taken along the line 5-5 in FIG. 3. (First embodiment)
Figure 6:
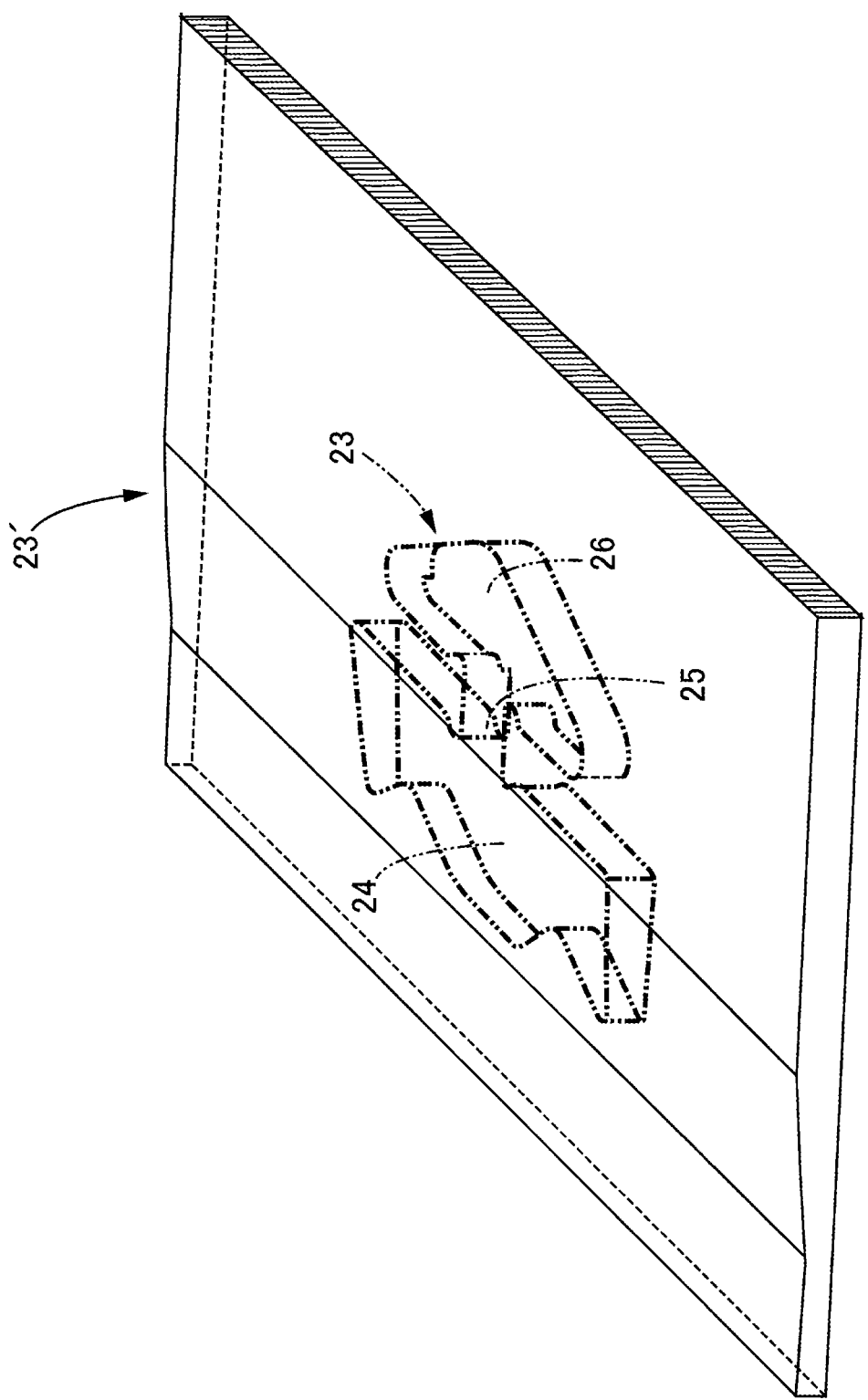
FIG. 6 is a perspective view showing a metal element material. (First embodiment)
Figure 7:
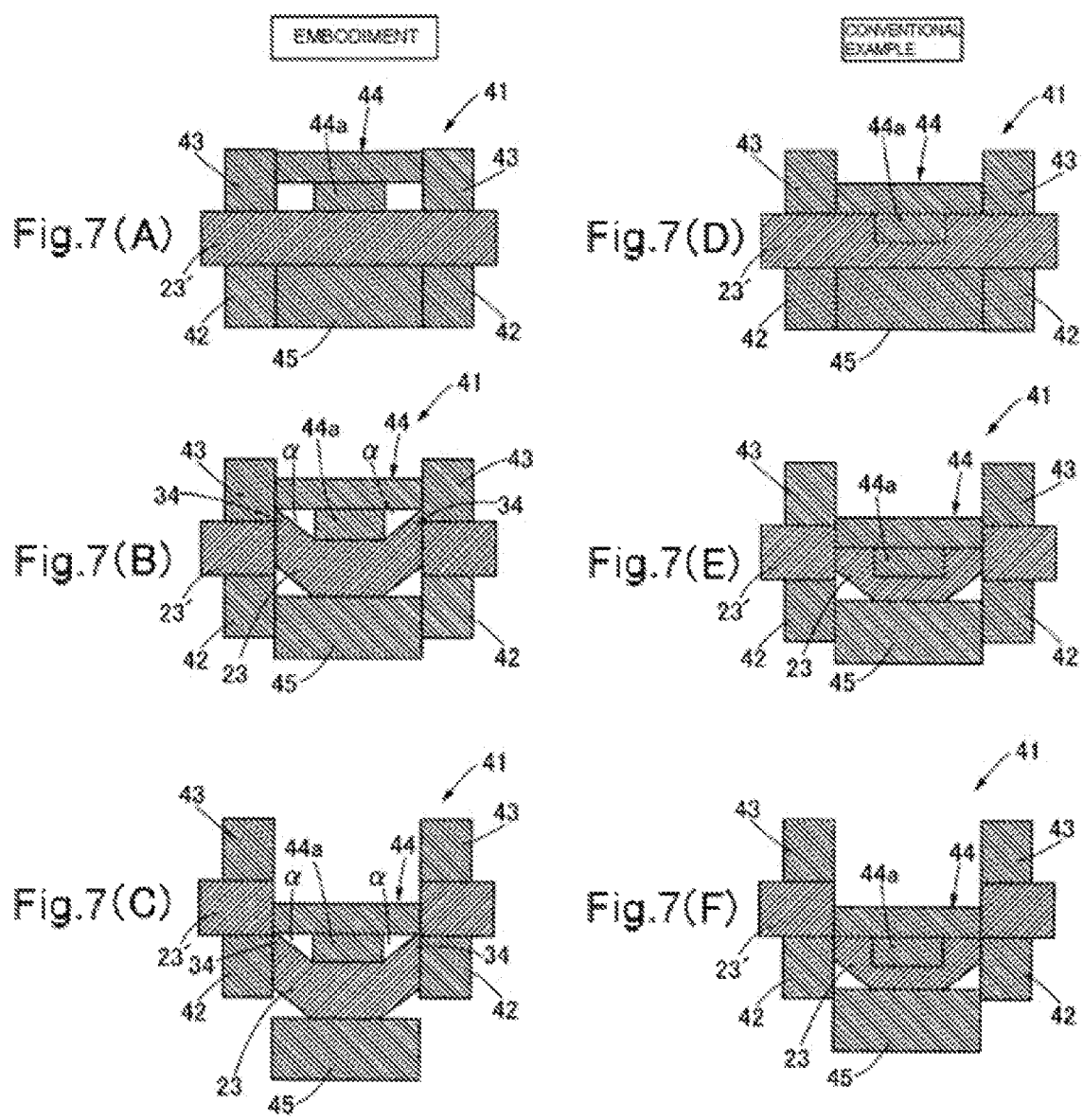
FIGS. 7(A) to 7(F) are schematic explanatory views showing operation of a punching machine. (First embodiment)

As shown in FIG. 2 and FIG. 3, the metal belt 15 includes a pair of right and left metal rings 22 supporting many metal elements 23. In this specification, the direction in which the metal belt 15 travels is defined as the front direction of the longitudinal direction. When the metal belt 15 is wrapped around the drive pulley 13 and the driven pulley 14, the external peripheral side of drive pulley 13 and driven pulley 14 is defined as the outer side in the radial direction. The direction orthogonal to the longitudinal direction and the radial direction is defined as the lateral direction. For a metal element material 23' serving as a material of the metal element 23 (see FIG. 6) and a punching processing device 41 forming and punching the metal element 23 from the metal element material 23' (see FIG. 5 and FIGS. 7A) to 7(F)), directions corresponding to the longitudinal direction, the radial direction, and the lateral direction of the metal element 23 are defined as a longitudinal direction, a radial direction, and a lateral direction therefor.

The metal element 23 manufactured from the metal element material 23' includes a body portion 24 extending in the lateral direction, a neck portion 25 extending from the center in the lateral direction of the body portion 24 to the outer end in the radial direction, and an ear portion 26 in a substantially triangular connected to the radial direction outer end of the neck portion 25. A pair of ring slots 27 are formed between the body portion 24, the neck portion 25, and the ear portion 26, opening to the lateral direction outer side, so as to be engaged with the metal ring 22. A saddle surface 28 on which the inner peripheral surface of the metal ring 22 is seated is formed at the radial direction outer end of the body portion 24 facing the ring slots 27. A rocking edge 29 extending in the lateral direction is formed at the radial direction outer end on the front surface of the body portion 24. On the front surface of the body portion 24, there is formed an inclined surface 30 which is inclined inwardly in a radial direction and rearwardly from the rocking edge 29. The rocking edge 29 overlaps the front edge of the saddle surface 28, and accordingly, the rocking edge 29 is located at the radial direction outer end on the front surface of the body portion 24.

A pulley contact surface 31 coming into contact with the V surface of the drive pulley 13 and the driven pulley 14 is formed at both left and right ends of the body portion 24 of the metal element 23. A nose 32 in a truncated conical shape that can be engaged with a hole 33 in a truncated conical shape formed in the rear surface of the ear portion 26 is formed at the front surface of the ear portion 26 of the metal element 23.

In the lateral direction central portion of the rear surface of the ear portion 26 of the metal element 23, a recessed portion 26a is formed so as to surround the hole 33, and in addition, a recessed portion 24a smaller than the recessed portion 26a is formed in the lateral direction central portion of the radial direction outer end of the rear surface of the body portion 24 continuous to the radial direction inner side of the neck portion 25. In addition, bulging portions 34 extending in the radial direction inner end of the ear portion 26 continuous to both sides in the lateral direction of the recessed portion 26a, i.e., at positions facing the radial direction outer end, extending in the lateral direction and projecting rearwardly of the ring slot 27 is formed so as to enclose the hole 33.

As shown in FIG. 5 and FIGS. 7(A) to 7(F), the punching processing device 41 which performs pressing and punching of the metal element 23 from the metal element material 23' includes a die 42 and a plate retainer 43 for fixing the metal element material 23' in the longitudinal direction, a main punch 44 that slidably fits in a hole having the same shape as the outer shape of the metal element 23 formed on the die 42 and comes into contact with the rear surface of the metal element 23, and a counter punch 45 that fits slidably in a hole having the same shape as the outer shape of the metal element 23 and comes into contact with the front surface of the metal element 23, and the main punch 44 and the counter punch 45 are movable in the longitudinal direction relative to the die 42 and the plate retainer 43 with a hydraulic cylinder (not shown).

On the front surface of the main punch 44, protrusion portions 44a, 44b for forming the recessed portions 26a, 24a are provided on the rear surface of the metal element 23 in a protruding manner. It should be noted that the thickness of the metal element 23 in the longitudinal direction is, for example, about 1.5 mm, and the projecting height of the protrusion portions 44a, 44b is, for example, about 0.02 mm.

Next, the operation of the first embodiment having the above configuration will be described.

As shown in the embodiment of FIG. 5 and FIGS. 7(A) to 7(C), first, the metal element material 23' is sandwiched and fixed between the die 42 and the plate retainer 43 of the punching processing device 41 (see FIG. 7(A)). Subsequently, while the metal element material 23' is clamped and press-processed in the longitudinal direction between the main punch 44 and the counter punch 45, the main punch 44 and the counter punch 45 are moved relative to the die 42 and the plate retainer 43, so that the nose 32 and the hole 33 are formed, and in the main punch 44, protrusion portions 44a, 44b form the recessed portions 26a, 24a of the metal element 23 (see FIG. 7(B)). At this time, the material extruded from the recessed portions 26a, 24a by the protrusion portions 44a, 44b flows in the lateral direction outer side, and the material bulges rearwardly at the radial direction inner edge of the ear portion 26, so that the bulging portion 34 protrudes along the radial direction inner edge of the ear portion 26. At this time, the load to which the counter punch 45 is biased toward the main punch 44 is set lower than the conventional load, and in the vicinity of the bulging portion 34, a gap a (see FIGS. 7(B) and 7(C)) remains between the metal element material 23' and the main punch 44.

Subsequently, when the main punch 44 and the counter punch 45 are further integrally moved relative to the die 42 and the plate retainer 43, the metal element 23 is punched from the metal element material 23' by shearing. The metal element 23 molded in this manner has a bulging portion 34 (FIG. 3 to FIG. 5) which projects rearward along the radial direction inner edge of the ear portion 26 in its rear surface, so that the thickness in the longitudinal direction of the metal element 23 in the bulging portion 34 becomes slightly thicker than the other portions.

On the other hand, in the conventional example of FIGS. 7(D) to 7(F), when the metal element material 23' is clamped and press-processed in the longitudinal direction between the main punch 44 and the counter punch 45, the load at which the counter punch 45 is biased toward the main punch 44 is set stronger than that in the above embodiment, and the protrusion portions 44a, 44b of the main punch 44 completely bite into the metal element material 23', and therefore, no gap a is generated between the metal element material 23' and the main punch 44, and the bulging portion 34 generated in the embodiment is not formed (see FIG. 7(D)).

Subsequently, when the main punch 44 and the counter punch 45 are integrally moved relative to the die 42 and the plate retainer 43, the metal element 23 is stamped out from the metal element material 23' (see FIGS. 7(E) and 7(F)).

As described above, in the present embodiment, when the metal element 23 is press-formed with the main punch 44 and the counter punch 45, the load of counter punch 45 is set low, and the gap a is generated between the metal element material 23' and the main punch 44, so that the bulging portion 34 can be reliably formed. In addition, the load applied to the main punch 44 and the counter punch 45 is reduced, thereby improving the durability of the punching processing device 41.

Figure 8:
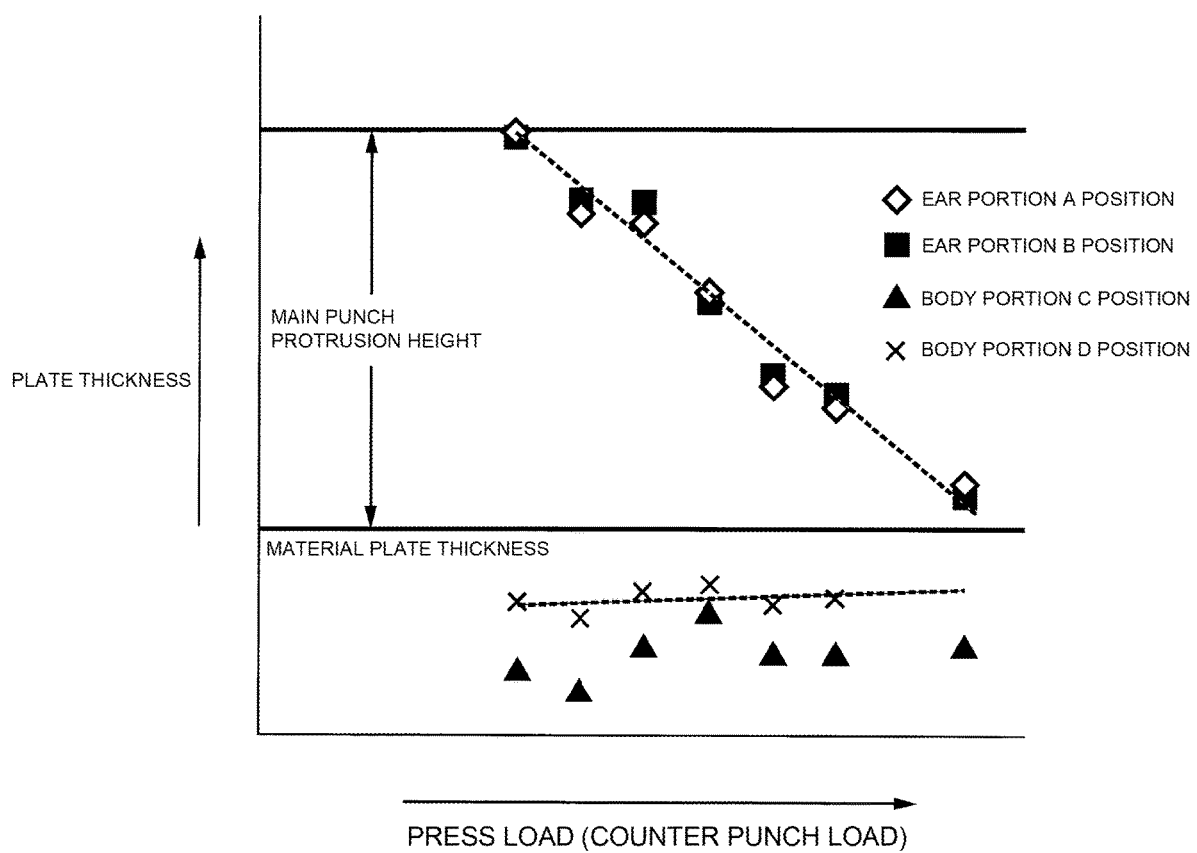
FIG. 8 is a graph showing a relationship between a press load and a plate thickness. (First embodiment)

The graph in FIG. 8 shows the relationship between the load of the counter punch 45 and the plate thickness of the metal element 23 at the position of the bulging portion 34. In FIG. 8, ◇ corresponds to the bulging portion 34 at the left side (see position A of FIG. 3), ■ corresponds to the bulging portion 34 at the right side (see position B of FIG. 3), ▲ corresponds to the left side of the body portion 24 facing the saddle surface 28 (see position D of FIG. 3), and x corresponds to the right side of the body portion 24 facing the saddle surface 28 (see position E of FIG. 3).

From this graph, it can be seen that as the load of the counter punch 45 is reduced, the projecting height of the bulging portion 34 increases accordingly (see ◇ and ■). Since the bulging portion 34 is not formed on the body portion 24 facing the saddle surface 28, it is understood that even if the load of the counter punch 45 is changed, the plate thickness of that portion hardly changes (see ▲ and x)

Figure 9:
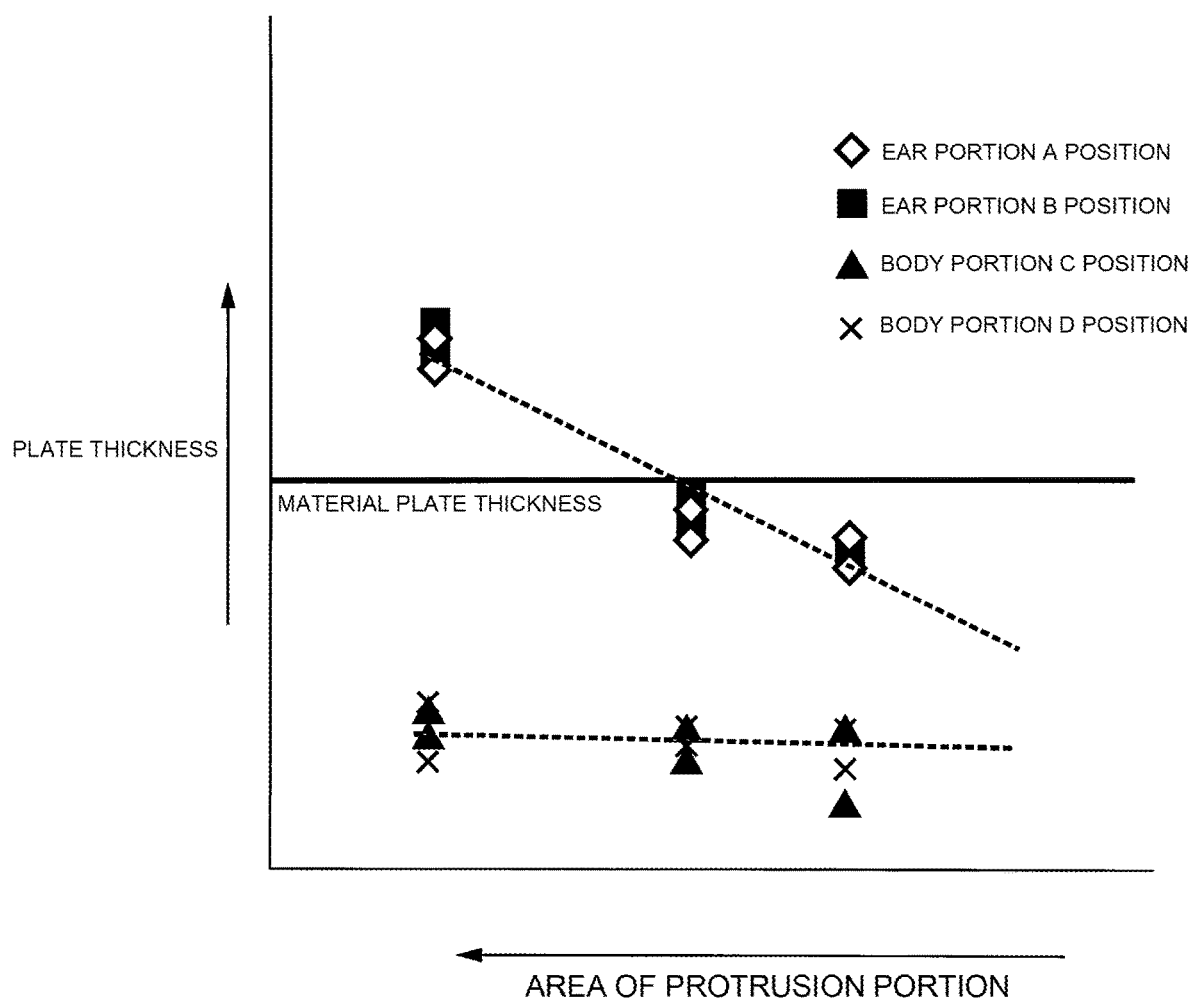
FIG. 9 is a graph showing a relationship between the area of the protrusion portion of the main punch and the plate thickness. (First embodiment)

The graph in FIG. 9 shows the relationship between the area of the protrusion portion 44a forming the recessed portion 26a of the ear portion 26 and the plate thickness of the metal element 23 at the position of the bulging portion 34. As the area of the protrusion portion 44a increases, the amount of material extruded from recessed portion 26a increases accordingly, and therefore, the projecting height of the bulging portion 34 increases (see ◇ and ■). The bulging portion 34 is not formed on the body portion 24 facing the saddle surface 28, and therefore, even if the area of the protrusion portion 44a of the ear portion 26 is changed, the plate thickness of that portion is hardly displaced (see ▲ and x).

As described above, according to the present embodiment, the protrusion portions 44a and 44b are formed in the main punch 44, and the bulging portion 34 protrudes to the radial direction inner end of the rear surface of the ear portion 26 of the metal element 23, and the maximum plate thickness of the ear portion 26 is increased by the bulging portion 34, so that the balance of the plate thicknesses of the ear portion 26 and the body portion 24 can be arbitrarily adjusted. At this occasion, the volumes of the protrusion portions 44a, 44b and the volume of the bulging portion 34 substantially the same as each other, and therefore, adjusting the heights of the protrusion portions 44a, 44b makes it possible to adjust the amount of protrusion of the bulging portion 34, which facilitates control of thickness of the metal element 23.

Second Embodiment

Figure 10:
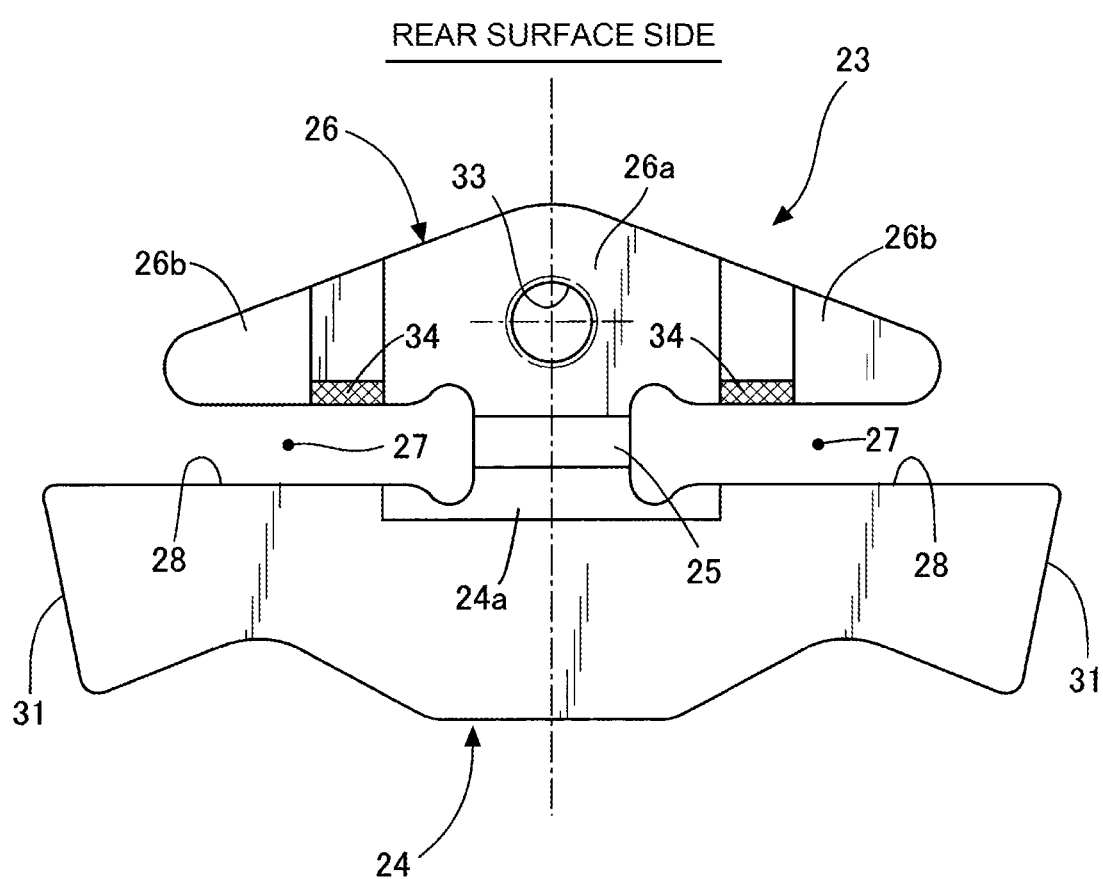
FIG. 10 is a rear view showing a metal element. (Second embodiment)

Next, the second embodiment of the present invention will be explained with reference to FIG. 10.

In the second embodiment, the number of the protrusion portions 44a of the main punch 44 is increased to three, so that two recessed portions 26b are also famed in not only the recessed portion 26a of the lateral direction central portion of the ear portion 26 of the metal element 23 but also the lateral direction both end portions of the ear portion 26 of the metal element 23. As a result, the bulging portion 34 of the metal element 23 is famed at a position sandwiched between the recessed portion 26a at the center in the lateral direction and the recessed portion 26b at the lateral direction both ends.

According to this embodiment, the bulging portion 34 can be reliably famed by the material extruded material from both of the recessed portion 26a of the lateral direction central portion of the rear surface of the ear portion 26 and the recessed portion 26b in the lateral direction both end portions.

Third Embodiment

Figure 11:
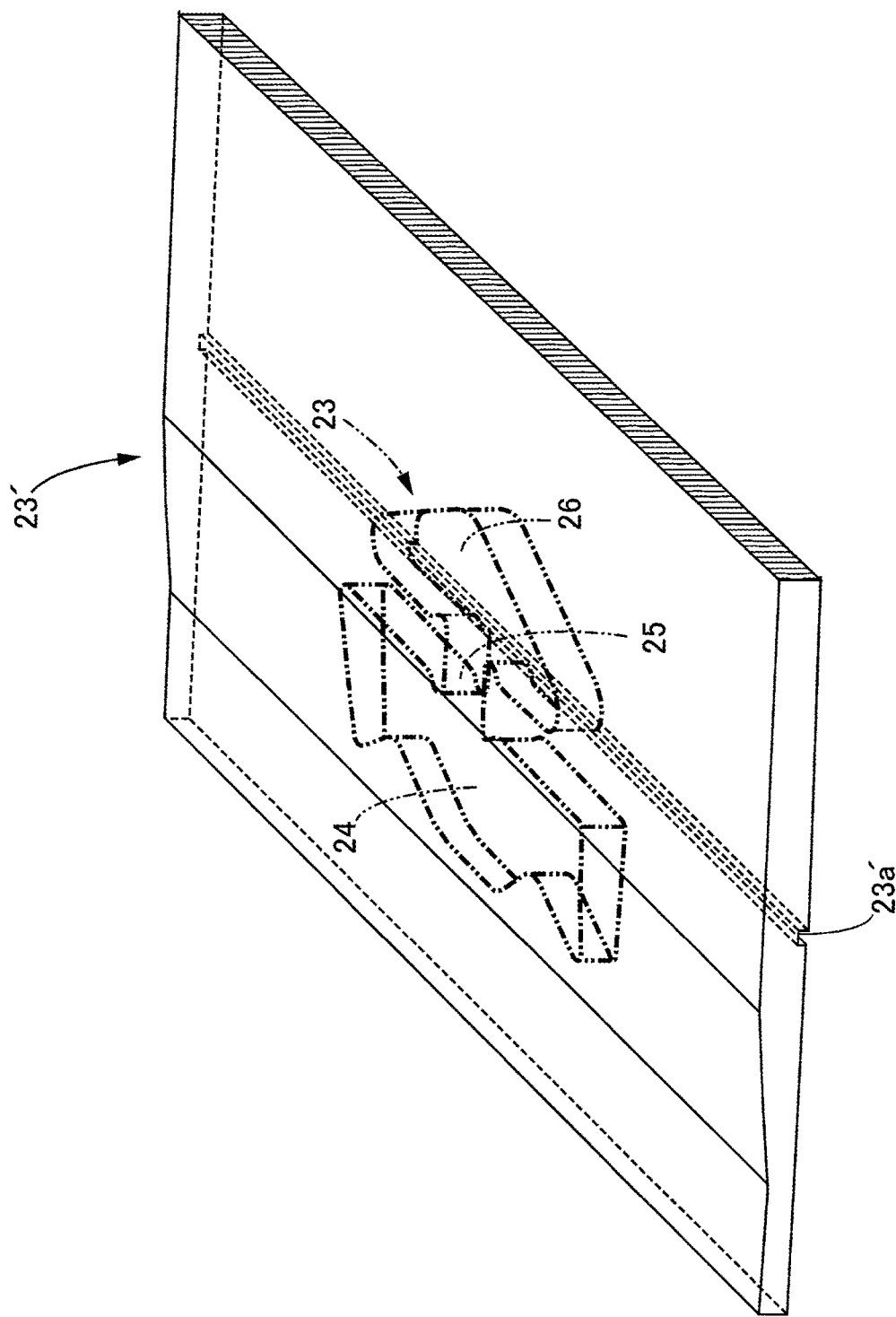
FIG. 11 is a perspective view showing a metal element material. (Third embodiment)

Next, the third embodiment of the present invention will be explained with reference to FIG. 11.

The third embodiment is a modification of the first embodiment in which a linear groove portion 23a' is famed in advance at a position corresponding to the radial direction inner end of the ear portion 26 on the rear surface of the metal element material 23'. When this metal element material 23' is pressed by the main punch 44 and the counter punch 45, a part of the material extruded by the protrusion portion 44a of the main punch 44 flows into the groove portion 23a, so that the projecting height of the bulging portion 34 decreases accordingly. For example, when it is assumed that the protruding height of the bulging portion 34 of the first embodiment is 0.02 mm, a groove portion 23a' having a depth of 0.01 mm is formed in the metal element material 23', so that, finally, the bulging portion 34 with the projecting height of 0.01 mm can be obtained.

According to this embodiment, it is easy to control the projecting height of the bulging portion 34 by forming the groove portion 23a' in the metal element material 23'.

Fourth Embodiment

Figure 12:
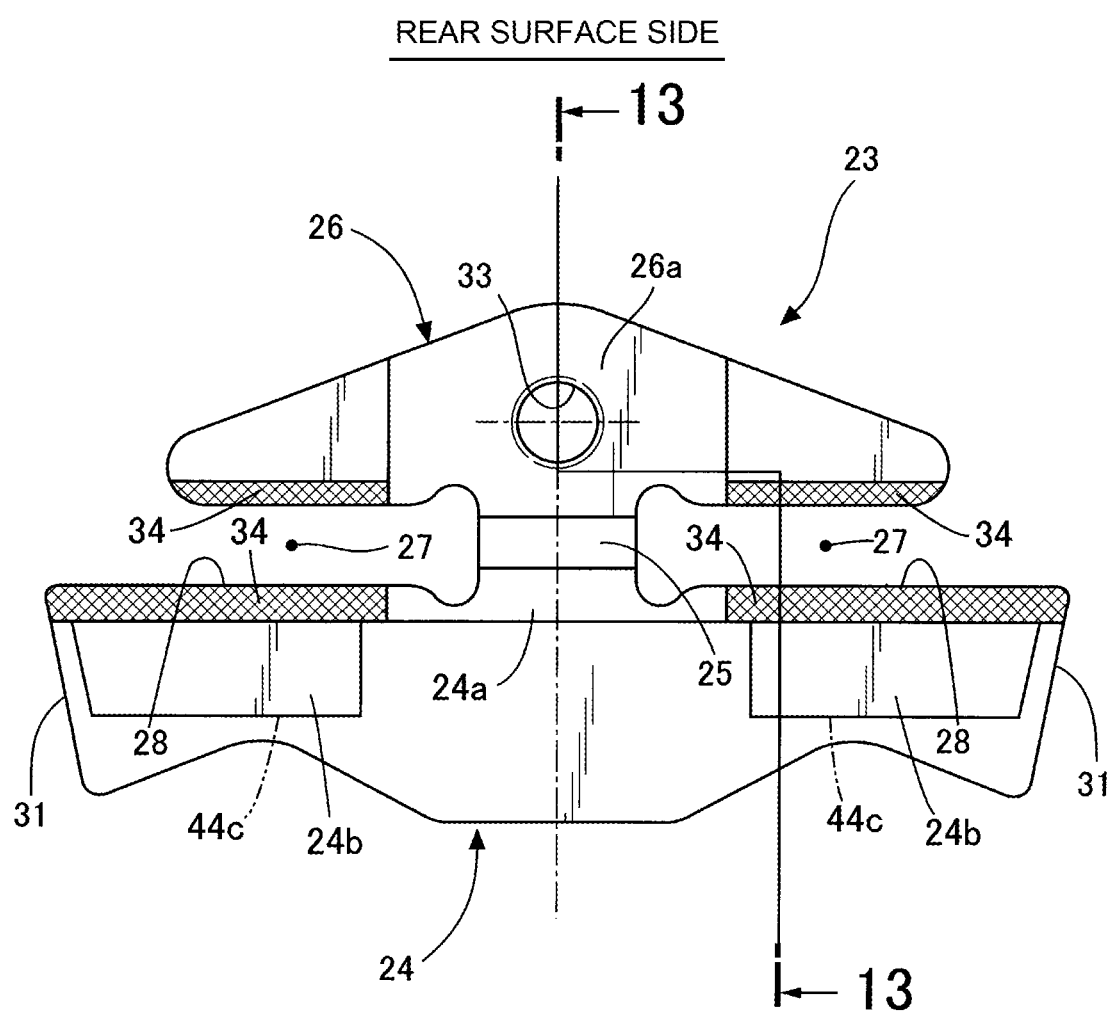
FIG. 12 is a rear view showing a metal element. (Fourth embodiment)
Figure 13:
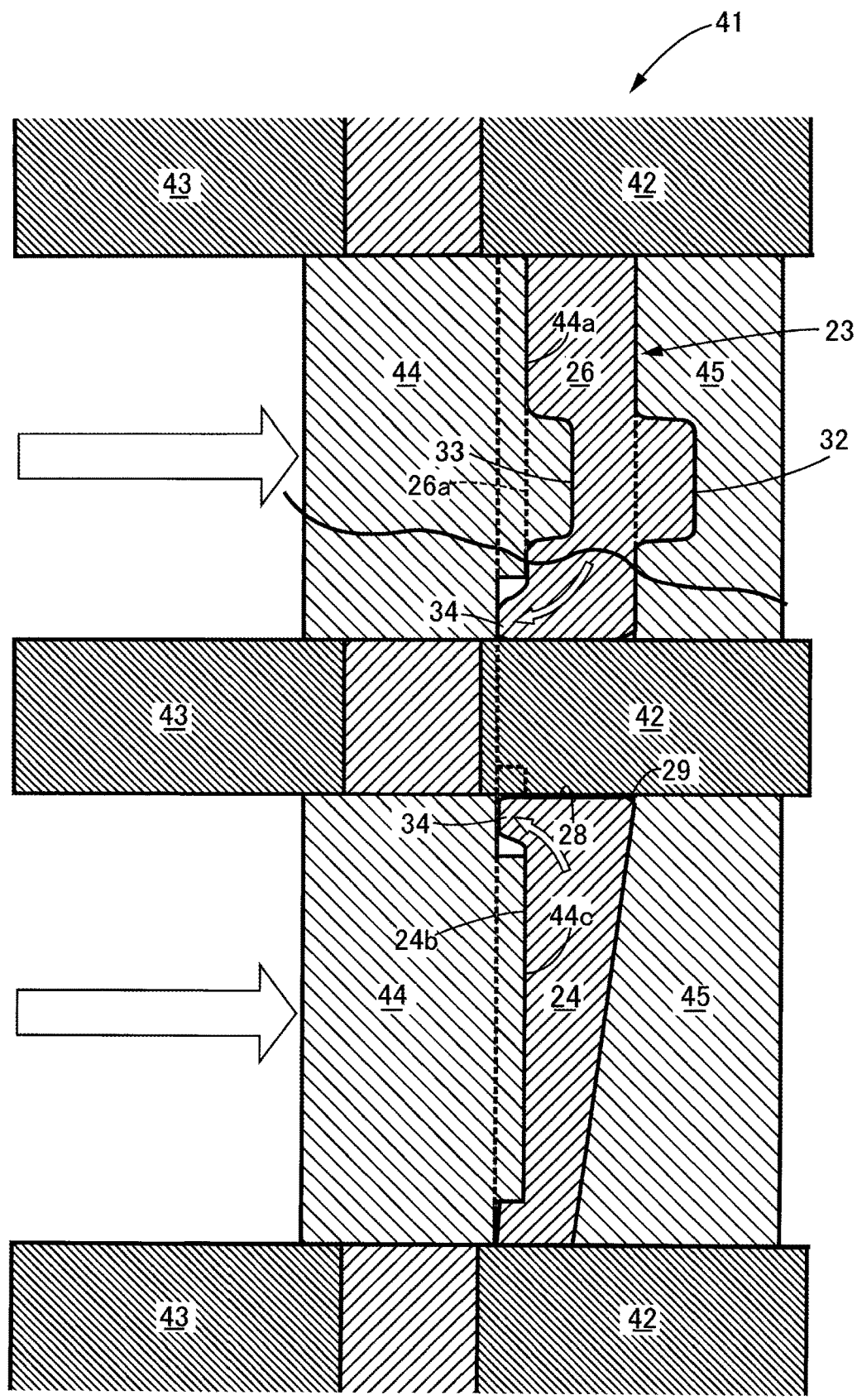
FIG. 13 is a sectional view showing a metal mold corresponding to the section taken along the line 13-13 of FIG. 12. (Fourth embodiment)

Next, the fourth embodiment of the present invention will be explained with reference to FIG. 12 and FIG. 13.

In the fourth embodiment, the main punch 44 has twice the protrusion portion 44c. Two protrusion portions 44c form two recessed portions 24b at the lateral both end sides on the rear surface of the body portion 24 of the metal element 23. As a result, two bulging portions 34 extending in the lateral direction are formed by the material extruded from both the recessed portion 24a and the recessed portion 24b at the upper end in the radial direction of the rear surface of the body portion 24, i.e., in the vicinity of the position where the body portion 24 faces the saddle surface 28.

According to this embodiment, the bulging portion 34 is formed in each of the ear portion 26 and the body portion 24 that sandwich the ring slot 27 of the metal element 23, and therefore, the height of both bulging portions 34 is controlled, so that the balance of the plate thickness inside and outside in the radial direction of the metal element 23 can be adjusted with higher precision.

Fifth Embodiment

Figure 14:
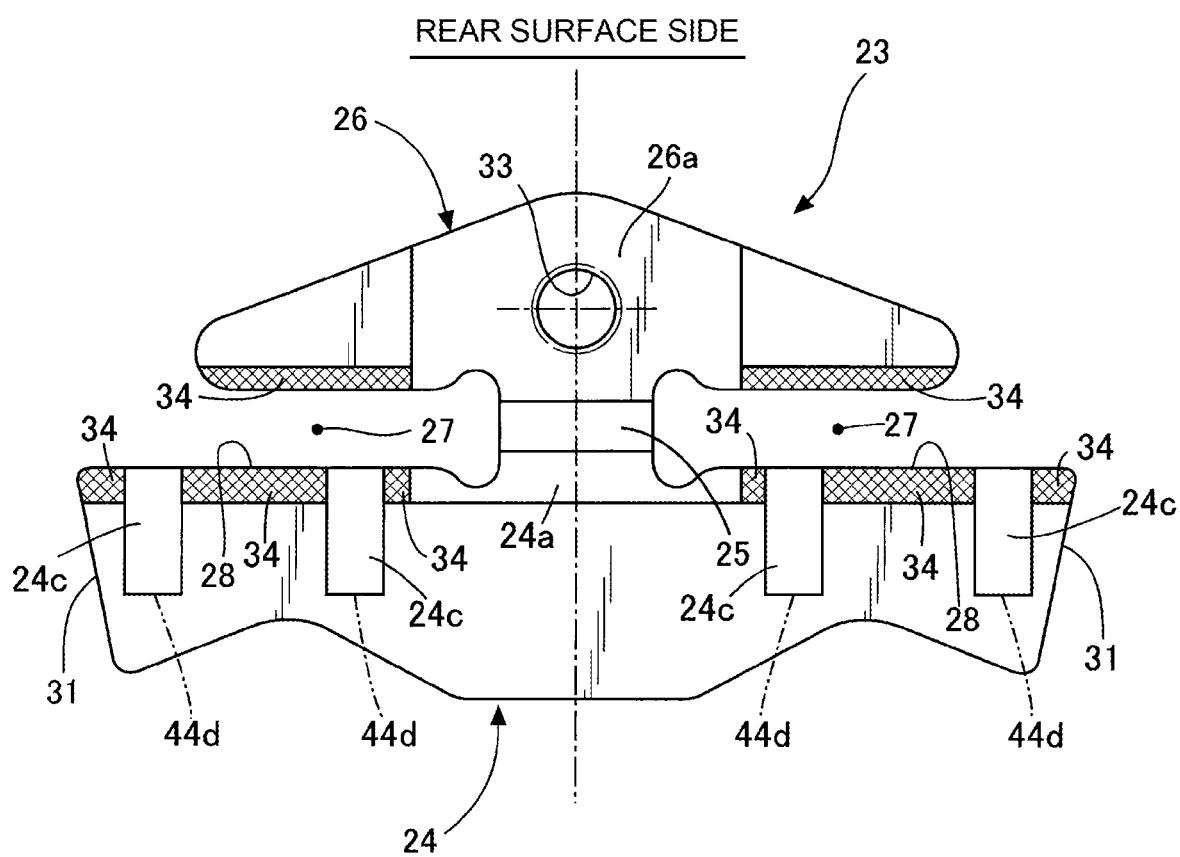
FIG. 14 is a rear view showing a metal element. (Fifth embodiment)

Next, the fifth embodiment of the present invention will be explained with reference to FIG. 14.

The fifth embodiment is a modification of the fourth embodiment in which two protrusion portions 44d of the main punch 44 for forming the recessed portion 24c in the body portion 24 are respectively provided at the right and the left. The radial direction outer end of the quadrupled recessed portion 24c formed in the body portion 24 has reached the saddle surface 28, so that the lateral bulging portion 34 is divided into three parts.

Sixth Embodiment

Figure 15:
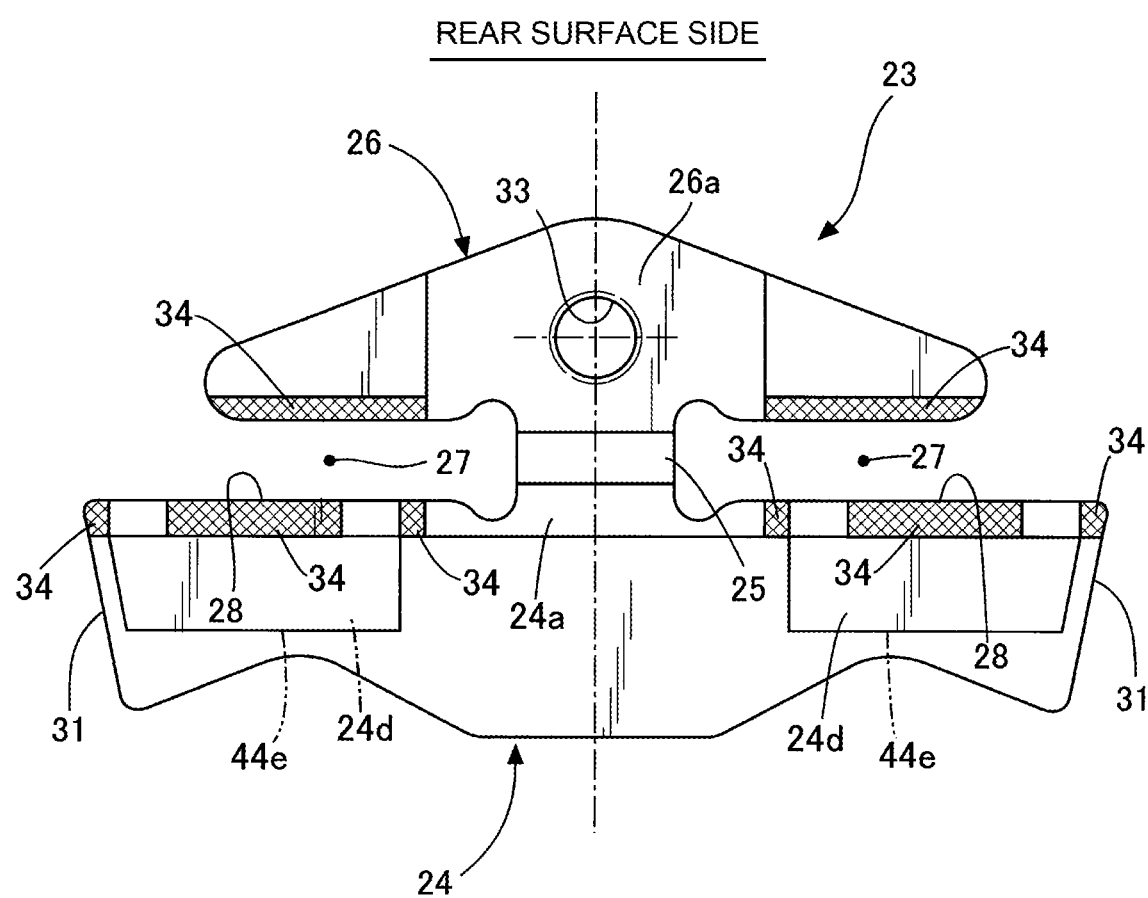
FIG. 15 is a rear view showing a metal element. (Sixth embodiment)

Next, the sixth embodiment of the present invention will be explained with reference to FIG. 15.

The sixth embodiment is a combination of the fourth embodiment and the fifth embodiment, in which in order to form two C-shaped recessed portions 24d in the body portion 24, two C-shaped protrusion portions 44e are formed in the main punch 44.

Seventh Embodiment

Next, the seventh embodiment of the present invention will be explained with reference to FIGS. 16 and 17.

Figure 16A:
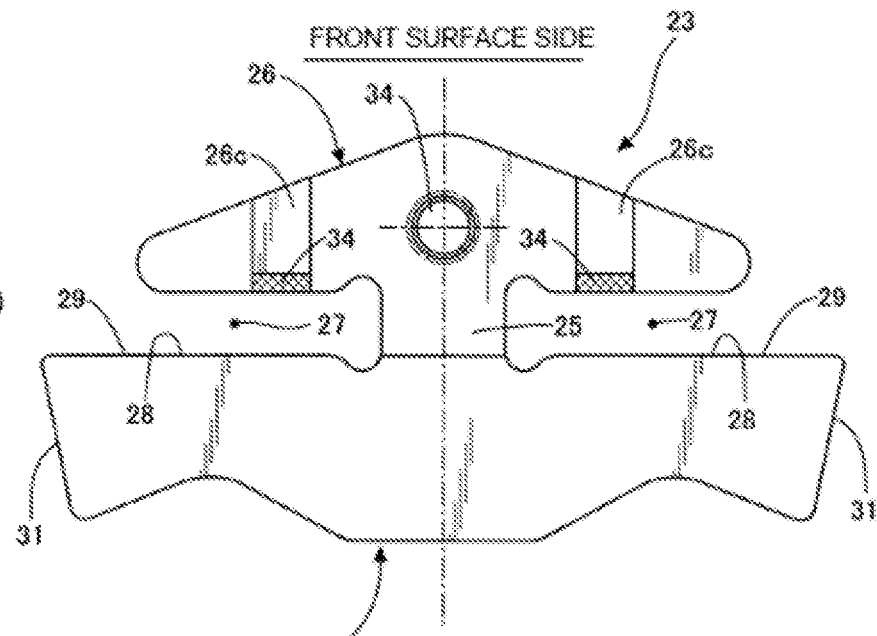
FIGS. 16(A) and (B) are front views showing a metal element. (Seventh Embodiment)
Figure 16B:
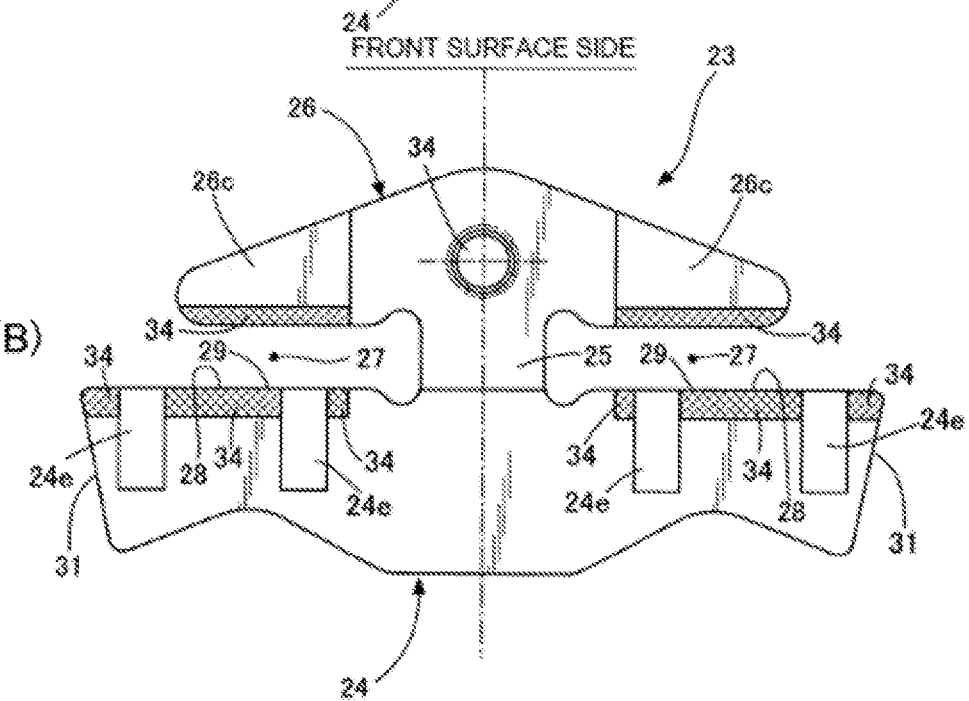

In the first to sixth embodiments, the bulging portion 34 is provided on the rear surface of the metal element 23, but, as shown in FIG. 16, in the seventh embodiment, a bulging portion 34 is provided on the front surface of the ear portion 26 of the metal element 23, or bulging portions are provided on the front surface of the ear portion 26 and the body portion 24 of the metal element 23. The bulging portion 34 on the front surface of the ear portion 26 is formed by the material extruded from the recessed portion 26c on the front surface of the ear portion 26, and the bulging portion 34 on the front surface of the body portion 24 is formed by the material extruded from the recessed portion 24e on the front surface of the body portion 24.

FIG. 17 is a schematic diagram illustrating the punching machine 41. In this embodiment, the metal element 23 is provided with, at the side of the counter punch 45, the protrusion portions 45a, 45b for forming the recessed portions 26c, 24e respectively. Therefore, when the metal element material 23' is clamped and pressed between the main punch 44 and the counter punch 45 in the longitudinal direction, the material extruded from the recessed portions 26c, 24e by the protrusion portions 45a, 45b of the counter punch 45 bulges forward from the front surface of the metal element 23, and the bulging portion 34 is formed on the front surface of the metal element 23. As described above, according to the present embodiment, the same operational effects as those of the first to sixth embodiments can be achieved.

Although the embodiments of the present invention have been described above, it is possible for the present invention to make design changes as much as possible without departing from the gist thereof.

For example, in the first to third embodiment, the bulging portion 34 is provided only in the ear portion 26, and in the fourth to sixth embodiment, the bulging portion 34 is provided in both the ear portion 26 and the body portion 24, but the bulging portion 34 may be provided only in the body portion 24.

In the embodiment, the bulging portion 34 is provided on only the rear surface or the front surface of the metal element 23. Alternatively, this may be provided on both of the rear surface and the front surface of the metal element 23.

The invention claimed is:

1. A method for manufacturing metal elements each engageable with a pair of metal rings of a continuously variable transmission apparatus, each of the metal elements comprising: a pair of ear portions; a body portion; a pair of ring slots formed between the pair of ear portions and the body portion at a left and right sides of the metal element, respectively, such that the pair of metal rings are engaged with the pair of ring slots and supported by a saddle surface of the body portion in a radial direction of the pair of metal rings; a neck portion extending between the pair of ring slots to connect the pair of ear portions and the body portion, the pair of ear portions being located at a radial direction outer side of the neck portion, the body portion having the saddle surface supporting an inner peripheral surface of the metal ring at a radial direction inner side of the neck portion; a rocking edge extending in a left-right direction along a front edge of the saddle surface; and an inclined surface extending in a radial direction inner side and rearwardly from the rocking edge, the method comprising:
providing a band plate-shaped metal element material having a constant cross section;
placing the band plate-shaped metal element material in a metal mold comprising a main punch to be in contact with a rear surface of the band plate-shaped metal element material and a counter punch to be in contact with a front surface of the band plate-shaped metal element material, wherein the main punch or the counter punch has a protrusion portion to be in contact with at least a part of the body portion to form a recessed portion thereon; and
by using the metal mold, performing press processing and punching processing on the band plate-shaped metal element material, thereby forming the metal element having the pair of ear portions, the body portion, the pair of ring slots formed between the pair of ear portions and the recessed portion on the body portion in a manner that forms a bulging portion bulging backward in a front-rear direction from a radial direction outer edge of the body portion so as to increase a thickness of the body portion by the bulging portion, the bulging portion being formed of the metal element material extruded from the recessed portion formed by the protrusion portion, the counter punch being in contact with a front surface of the metal element, thereby forming the rocking edge on the front surface of the metal element,
wherein each of the metal elements is formed such that when the metal elements can be aligned in the front-rear direction, the rocking edge of the metal element placed on a rear side is in contact with the bulging portion of the adjacent metal element placed on a front side.

2. The method according to claim 1, wherein when the formation of the metal element in the metal mold is completed, a gap is left between the main punch or the counter punch and the metal element.

3. The method according to claim 1, wherein a volume of the protrusion portion is substantially equal to a volume of the bulging portion.

4. The method according to claim 1, wherein in the press processing and punching processing of the metal element, the protrusion portion is in contact with a central portion and both end portions of the ear portions in the left-right direction.

5. The method according to claim 1, wherein the band plate-shaped metal element material has a groove portion at a position corresponding to the bulging portion.

6. A method for manufacturing a metal element engageable with a pair of metal rings of a continuously variable transmission apparatus, the metal element comprising: a pair of ear portions; a body portion; a pair of ring slots formed between the pair of ear portions and the body portion at a left and right sides of the metal element, respectively, such that the pair of metal rings are engaged with the pair of ring slots and supported by a saddle surface of the body portion in a radial direction of the pair of metal rings; a neck portion extending between the pair of ring slots to connect the pair of ear portions and the body portion, the pair of ear portions being located at a radial direction outer side of the neck portion, the body portion having the saddle surface supporting an inner peripheral surface of the metal ring at a radial direction inner side of the neck portion; a rocking edge extending in a left-right direction along a front edge of the saddle surface; and an inclined surface extending in a radial direction inner side and rearwardly from the rocking edge, the method comprising:
providing a band plate-shaped metal element material having a constant cross section;
placing the band plate-shaped metal element material in a metal mold comprising a main punch to be in contact with a rear surface of the band plate-shaped metal element material and a counter punch to be in contact with a front surface of the band plate-shaped metal element material, wherein the main punch or the counter punch has a protrusion portion to be in contact with at least a part of the ear portions or the body portion to form a recessed portion thereon; and by using the metal mold, performing press processing and punching processing on the band plate-shaped metal element material, thereby forming the metal element having the pair of ear portions, the body portion, the pair of ring slots formed between the pair of ear portions and the recessed portion on the body portion in a manner that forms a bulging portion bulging in a front-rear direction from a radial direction inner edge of the ear portions or a radial direction outer edge of the body portion, the bulging portion being formed of the metal element material extruded from the recessed portion formed by the protrusion portion, wherein the band plate-shaped metal element material has a groove portion at a position corresponding to the bulging portion.

7. The method according to claim 6, wherein when the formation of the metal element in the metal mold is completed, a gap is left between the main punch or the counter punch and the metal element.

8. The method according to claim 6, wherein a volume of the protrusion portion is substantially equal to a volume of the bulging portion.

9. The method according to claim 6, wherein in the press processing and punching processing of the metal element, the protrusion portion is in contact with a central portion and both end portions of the ear portions in the left-right direction.

\* \* \* \* \*